(12) United States Patent
Aggarwal et al.

(10) Patent No.: US 6,917,969 B2
(45) Date of Patent: Jul. 12, 2005

(54) PORTABLE BEAN-BASED CONTENT RENDERING

(75) Inventors: Radhika Aggarwal, Raleigh, NC (US); William H. Krebs, Jr., Cary, NC (US); Elizabeth A. Schreiber, Apex, NC (US); David B. Styles, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 743 days.

(21) Appl. No.: 10/041,177

(22) Filed: Jan. 3, 2002

(65) Prior Publication Data

US 2004/0205566 A1 Oct. 14, 2004

(51) Int. Cl.[7] .............................................. G06F 13/00
(52) U.S. Cl. ...................... 709/219; 709/203; 719/315; 719/329; 707/103
(58) Field of Search ................................ 709/203, 217, 709/219; 707/103; 719/315, 328, 329

(56) References Cited

U.S. PATENT DOCUMENTS

| | | | | |
|---|---|---|---|---|
| 5,117,349 A | | 5/1992 | Tirfing et al. ................ | 395/600 |
| 5,857,197 A | * | 1/1999 | Mullins ..................... | 707/103 R |
| 6,012,098 A | | 1/2000 | Bayeh et al. ................ | 709/246 |
| 6,055,569 A | | 4/2000 | O'Brien et al. .............. | 709/223 |
| 6,182,029 B1 | | 1/2001 | Friedman .................... | 704/9 |
| 6,286,051 B1 | * | 9/2001 | Becker et al. ............... | 709/236 |
| 2003/0018700 A1 | * | 1/2003 | Giroti et al. ................ | 709/201 |
| 2003/0225829 A1 | * | 12/2003 | Pena et al. .................. | 709/203 |
| 2004/0123048 A1 | * | 6/2004 | Mullins et al. .............. | 711/141 |

FOREIGN PATENT DOCUMENTS

WO WO 00/20985 4/2000 ........... G06F/15/30

OTHER PUBLICATIONS

"Servlet/Applet/HTML Authentication Process With Single Sign–On", *Research Disclosure*, pp. 163–165, (Jan. 2000).
Thede, E. "Web Based Data Management: HTML vs. PDF vs. XML", *PC AI*, vol. 14, No. 6, pp. 21–224, (Nov.–Dec. 2000).
Hipola, P., et al. "Digital Publishing: Formats and Alternatives", *E1 Professional de la Informacion*, vol. 9, No. 10, pp. 4–15, (Oct. 2000).
Kuramitsu, K., et al., "Distributed Object–Oriented Schema for XML–Based Electronic Catalog Sharing Semantics Among Businesses", *Proceedings of the First International Conference on Web Information Systems Engineering*, Pt. vol. 1 pp. 87–96, (2000).

(Continued)

*Primary Examiner*—Viet D. Vu
(74) *Attorney, Agent, or Firm*—Steven M. Greenberg

(57) ABSTRACT

A variable content rendering system. The system can include one or more programmatic beans configured to render content in particular ones of the presentation environments; a mapping of selected attributes of a markup language to corresponding ones of the configured beans; and, a servlet configured to receive requests for content from individual content browsers in associated presentation environments. Importantly, the servlet can be further configured to retrieve the requested content, to identify individual markup language attributes in the retrieved content, and, based on the mapping, to select individual ones of the programmatic beans to format the retrieved content for presentation in the associated presentation environments.

16 Claims, 2 Drawing Sheets

OTHER PUBLICATIONS

Maruyama, N., et al., "Electronic Catalog Based on XML: Application to SmartEDI–an Internet EC Service", *NTT Review*, vol. 12, No. 3, pp. 41–44, (May 2000).

Madsen, P., "Using XML to Create State–Dependent Information Support for Web–Based Management Applications", *XL 98 Conference Proceedings*, pp11, (1998).

Andrivet, S., "A Simple XML Parser", *C/C+ + Users Journal*, vol. 17, No. 7 (Jul. 1999).

Chen, JCY, et al., "WebReader: A Mechanism For Automating the Search and Collecting Information From the World Wide Web", *Proceedings of the First International Conference on Web Information Systems Engineering (Workshops)*, Pt. vol. 2, pp. 47–54, (2000).

Hyunbee, Kim, et al., "Building an XML and Web–Based Document Retrieval System", *20th Annual National Online Meeting*, Proceedings–1999, pp. 251–262, (1999).

* cited by examiner

| Bean | Tag |
|---|---|
| MyTreeNodeBean | <TREENODE> |
| OverrideClass | <TREECELL> |
| ... | ... |
| MyNewTagBean | <NEWTAG> |

FIG. 2A

| Backend Data | Bean Action | GUI Data Structure |
|---|---|---|
| Item(1) | <------update----------create------> | HTML Table, Row, Cell |
| Item(2) | <------update----------create------> | HTML Table, Row, Cell |
| ... | ... | ... |
| Item(n) | <------update----------create------> | HTML Table, Row, Cell |

FIG. 2B

PORTABLE BEAN-BASED CONTENT RENDERING

BACKGROUND OF THE INVENTION

1. Statement of the Technical Field

The present invention relates to the field of user interface rendering and more particular to the cross-platform rendering of content in variable presentation environments.

2. Description of the Related Art

Modern network-deployed client-server systems involve the generation and transmission of data requests over a network from clients to servers, and the resulting generation and transmission of a data responses to the requesting clients. In many cases, the servers can format data responses for presentation in particular clients. For instance, in the case of a Web application, a Web server can format requested data using the hypertext markup language (HTML) for presentation in a Web browser.

Recently, the extensible markup language (XML) has become a popular means for describing network distributable content. In particular, XML enjoys a flexibility in describing network distributable content which heretofore has been lacking in other markup languages like HTML. In consequence of the development and resulting widespread use of XML, presentation tools also have been developed for facilitating the reading and formatting of XML-formatted data for presentation in client browsers. Notwithstanding, to support older client environments which may include a diverse set of browsers for operation in a multiplicity of different operating systems and hardware platforms, it is necessary to avoid the use of newer tools if portability is an important goal.

For example, the same set of data produced by a server and formatted using XML may be presented at any time in each of a stand-alone executable client, a conventional desktop Web browser, and a microbrowser in a handheld device such as a cellular phone or personal digital assistant. Notably, each platform presents formatted data in different ways. Even in regard to the presentation of data in a conventional desktop Web browser, incompatibilities between browser versions further complicate the task at hand.

International Business Machines Corporation (IBM) has developed a solution which particularly addresses the problem of rendering XML-formatted data in one of a bevy of differing content browsers. This solution is described in substantial detail in U.S. Pat. No. 6,012,098 to Bayeh et al. (Bayeh). In the IBM solution, a system is described in which a content server isolates the retrieval of data from the rendering of the data into a presentation format. More particularly, data retrieval logic is isolated to a data servlet, while presentation formatting logic is isolated to a rendering servlet.

Still, the IBM solution described in Bayeh relies heavily upon the use of style sheets, for example style sheets formatted in accordance with the extensible style language (XSL) or the cascading style sheet (CSS). Importantly, style sheets typically require the use of corresponding style sheet parsers. Yet, as one skilled in the art will recognize, style sheets based upon XSL and CSS technology are not always an appropriate solution where computing resources are not abundant. In particular, computing resources are limited in those cases where "thin renderers" are utilized, for example in a microbrowser. Like other thin renderers, microbrowsers can support conventional HTML, but typically not style sheets. Thus, in the cases where content is to be distributed not only to robust desktop-based content browsers, but also to thin content browsers, a more flexible, resource efficient method is appropriate.

SUMMARY OF THE INVENTION

The present invention is a method and system which addresses the deficiencies of the prior art. Specifically, the method and system of the present invention can format content for presentation in varying presentation environments without overburdening the resources of the presentation environments by utilizing style sheets. To avoid overburdening the resources of thin clients, the method and system of the present invention can capitalize upon the efficiencies of programmatic bean technology. In particular, beans can be programmatically configured to format content for presentation in particular ones of the presentation environments.

As a particular example, in one aspect of the present invention, a method for variably rendering content for presentation in differing presentation environments can be provided. The method can include configuring one or more programmatic beans to render content in particular ones of the presentation environments; mapping selected attributes of a markup language to corresponding ones of the configured beans; and, deploying a servlet. Importantly, the servlet can be configured to receive requests for content from individual content browsers in associated presentation environments, to retrieve the requested content, to identify individual markup language attributes in the retrieved content, and, based on the mapping, to select individual ones of the programmatic beans to render the retrieved content for presentation in the associated presentation environments.

The use of the mapping can greatly simplify extending the present invention to accommodate new presentation environments. Specifically, the method also can include adding a new entry in the mapping for each new bean which has been configured to render content formatted by a new attribute in the markup language. Finally, the method can include configuring a default bean to render content where an associated attribute has not been mapped to any of the plurality of programmatic beans. In this way, even where a programmatic bean has not been configured to handle a new attribute, the method can accommodate the new attribute using default formatting algorithms.

Importantly, the markup language can be the extensible markup language (XML). In that case, the mapping step can include mapping selected attributes specified in an XML document type definition (DTD) to corresponding ones of the configured beans. Additionally, the method can include adding a new entry in the DTD for each new bean which has been configured to render content formatted by a new XML attribute.

In operation, a method for variably rendering content for presentation in differing presentation environments can include resolving a mapping between a tag in XML formatted content and a corresponding Java bean which has been configured to render XML-formatted content in a particular one of the differing presentation environments; and, passing the XML-formatted content to the corresponding Java bean. The Java bean, in turn, can format the XML-formatted content for presentation in the particular one of the differing presentation environments.

The method also can include synchronizing the presentation of the XML-formatted content in the particular one of the differing presentation environment with changes in the XML-formatted content. Finally, the method can include passing the XML-formatted content to a default Java bean in those cases where a mapping between a tag in XML formatted content and a corresponding Java bean cannot be resolved, the default Java bean having a configuration to format the XML-formatted content using default formatting parameters.

A variable content rendering system in accordance with the present invention can include one or more programmatic beans configured to render content in particular ones of the presentation environments; a mapping of selected attributes of a markup language to corresponding ones of the configured beans; and, a servlet configured to receive requests for content from individual content browsers in associated presentation environments. Importantly, the servlet can be further configured to retrieve the requested content, to identify individual markup language attributes in the retrieved content, and, based on the mapping, to select individual ones of the programmatic beans to format the retrieved content for presentation in the associated presentation environments.

The system also can include properties file storing alternative parameters for overriding individual entries in the mapping. Importantly, in one particular aspect of the present invention, the configured beans can be Java beans, each Java bean having a configuration for rendering content in a particular one of the presentation environments. The content itself can have a format such as a format prescribed by the hypertext markup language (HTML), dynamic HTML (DHTML), JavaScript, VBScript, Java Swing, wireless markup language (WML), and compressed HTML (cHTML). Notably, each of the configured beans can include synchronization logic for synchronizing the content with a corresponding presentation of the content in presentation elements in the particular ones of the presentation environments.

BRIEF DESCRIPTION OF THE DRAWINGS

There are shown in the drawings embodiments which are presently preferred, it being understood, however, that the invention is not limited to the precise arrangements and instrumentalities shown, wherein:

FIG. 2A is a table illustrating an exemplary mapping in accordance with the inventive arrangements; and, FIG. 2B is a table illustrating an exemplary synching in accordance with the inventive arrangements.

DETAILED DESCRIPTION OF THE PREFERRED EMBODIMENTS

Figure 1:
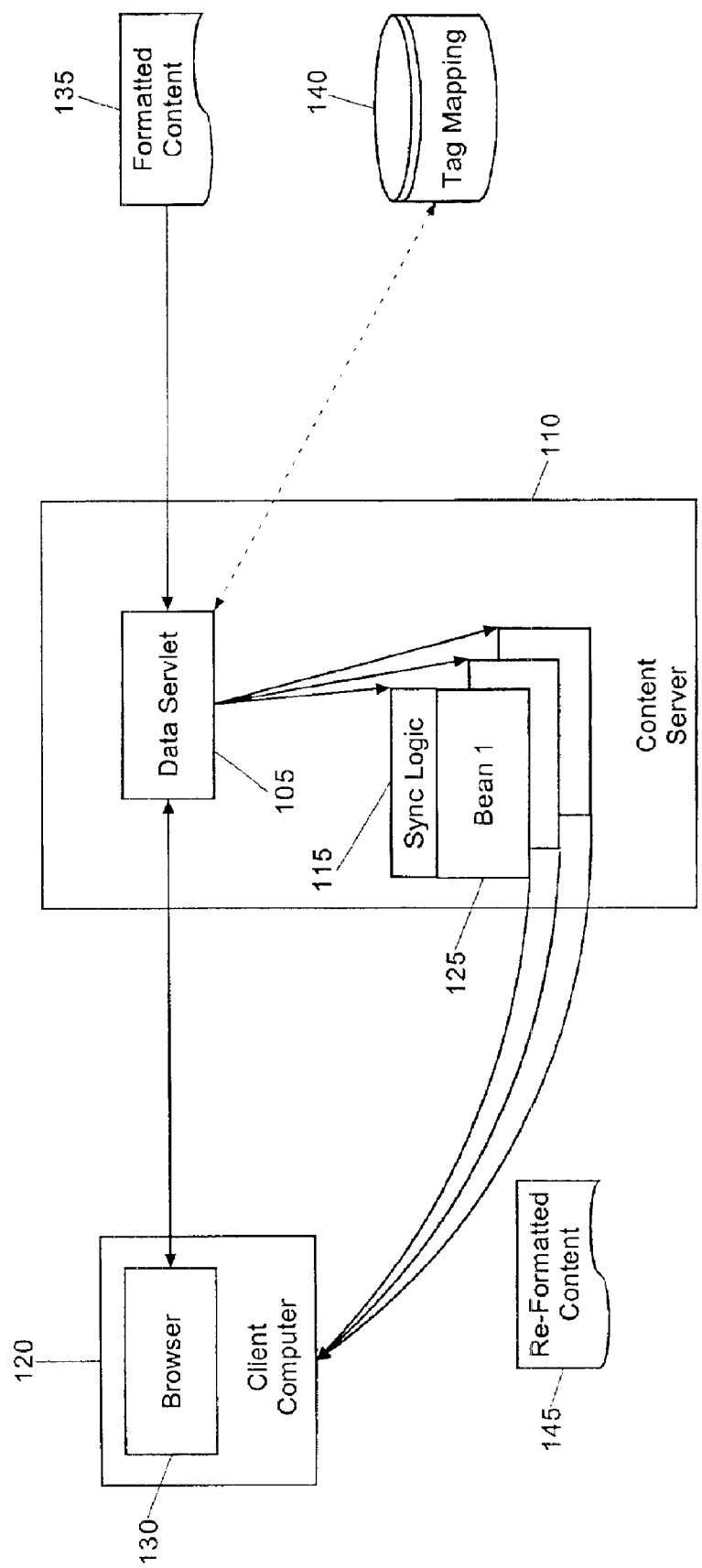
FIG. 1 is a block diagram illustrating a variable content rendering system which has been configured in accordance with the inventive arrangements.

The present invention is a method and system for rendering content in variable presentation environments. Specifically, in accordance with the inventive arrangements, requested content can be processed to determine how best to format the requested content into a format which can be presented in a particular environment. Unlike prior art attempts at rendering content in variable environments, however, in the present invention, programmatic beans can be utilized in a modular fashion to perform the content formatting. As a result, markup language attributes used to format portions of the requested content regardless of the presentation environment can be matched with particular, programmatic beans which can be configured to format content in ways which are particular to the presentation environment.

For instance, where the presentation environment is a handheld device, markup language attributes used to format portions of the requested content can be matched with particular, programmatic beans which can be configured to reformat the content using WML. By comparison, where the presentation environment is a Java Swing client, those same markup language attributes can be matched with other programmatic beans configured to generate Java Swing code for presenting the requested content in the Java Swing client. In any case, to support a new presentation environment such as DHTML, only a new set of programmatic beans for formatting content in using DHTML need be generated in addition to mapping the new set of beans to associated DHTML attributes.

FIG. 1 is a block diagram illustrating a variable content rendering system which has been configured in accordance with the inventive arrangements. The variable content rendering system can include a content server 110 which has been configured to interact with one or more client computers 120. In particular, the content server 110 can interact with the client computers 120 by receiving network requests for content generated in a content browser 130, and by replying to those network requests either with the requested content, or a message explaining why the request could not be satisfied. Though not always the case, the content server 110 of the present invention can be a Web server or an application server.

As shown in FIG. 1, the content server 110 can contain therein one or more instances of a data servlet 105. The data servlet 105 can be configured to "listen" for content requests, and respond to content request upon receipt thereof. A typical content request can arrive in the data servlet 105 in the form of an HTTP (hypertext transfer protocol) request which contains the uniform resource indicator (URI) of the requested content 135. In response, the data servlet 105 can retrieve the requested content 135 from either fixed storage, or another network location.

Notably, the requested content 135 can be formatted according to the rules of a markup language, such as HTML, XML, WML and any other number of SGML (standard generalized markup language) variants. Upon receiving the requested content 135, the servlet 135 can identify therein individual markup language attributes used to specify the presentation of associated content portions. For each markup language attribute identified, the servlet 135 can consult a mapping 140 to identify a programmatic bean 125 which has been configured to format content for presentation in a particular environment such as the environment of the requesting client 120.

Once the particular programmatic bean 125 has been identified, the requested content 135 can be passed to the programmatic bean 125 for processing. The programmatic bean 125, in turn, can format the content for presentation in the particular environment of the client computer 120, the programmatic bean 125 generating "re-formatted" content 145. Ultimately, the reformatted content 145 can be forwarded to the client computer 120 for presentation therein.

Importantly, the servlet 105 can match markup attributes to corresponding programmatic beans 125 using the mapping 140. FIG. 2A is a table illustrating an exemplary mapping in accordance with the inventive arrangements. As will be apparent to one skilled in the art, the mapping simply can match markup tags such as "<TREENODE>", "<TREE- CELL>" with respective programmatic beans such as "MyTreeNodeBean" and "OverrideClass". Significantly, where a particular markup tag cannot be matched to a specific programmatic bean, a default bean can be used as shown in the entry "MyNewTagBean"==>"<NEWTAG>".

One skilled in the art will recognize that the programmatic beans of the present invention can be implemented using well-known Java bean technology. By virtue of their object-oriented nature, Java beans can exhibit the property of extensibility. As such, once a core set of programmatic Java beans have been developed for a particular presentation environment, additional Java beans can be developed merely through extension or inheritance in order to support differences among instances of the presentation environment, or to support additional features of the presentation environment. In any case, using an optional properties file, the mapping of a specific markup language attribute with a default bean can be overridden with a mapping of the attribute to a different bean.

For a given presentation environment, only one bean 125 need be instantiated and all instance data can be stored in either the front-end client computer 120, or back-end. In that regard, each bean 125 of FIG. 1 can synchronize back-end data reflected in the content 135 with user interface elements in the browser 130 using synchronization logic 115. For example, as a user interacts with the data as displayed in the browser 130, the synchronization logic 115 can update the back-end data store accordingly. Conversely, as the back-end data changes, the presentation of the data in the browser 130 can change accordingly. To track the synchronization tasks assigned to each bean 125, each bean 125 can maintain a synchronization table as shown in FIG. 2B. The synchronization table simply can map back-end data to front-end data structures. Each entry in the table further can indicate what sort of action the bean should take, for instance updating a table cell or creating a new table cell.

As will be recognized by one skilled in the art, the foregoing invention can have particular application to the rendering of XML-formatted content in variable presentation environments. In this particular case, each XML tag name can be mapped to a Java bean name. If an XML tag is detected in requested content for which no matching bean can be found in the tag mapping, a "stub" handler can be used to present a generic representation of the associated data. Importantly, a different set of Java beans can be provided to render the XML content in different presentation environments, for example HTML, DHTML, WML, Java Swing, Javascript and VBScript. New XML tags can be processed simply by configuring a new bean and adding the tag to the XML DTD file. In this way, the content server can serve the same XML content to multiple users in multiple environments simply by accessing different sets of beans for each XML tag.

The present invention can be realized in hardware, software, or a combination of hardware and software. The system and method of the present invention can be realized in a centralized fashion in one computer system, or in a distributed fashion where different elements are spread across several interconnected computer systems. Any kind of computer system, or other apparatus adapted for carrying out the methods described herein, is suited.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for variably rendering content for presentation in differing presentation environments, the method comprising:

configuring a plurality of programmatic beans to format content for presentation in particular ones of the presentation environments;

mapping selected attributes of a markup language to corresponding ones of said configured beans; and, deploying a servlet configured to receive requests for content from individual content browsers in associated presentation environments, to retrieve said requested content, to identify individual markup language attributes in said retrieved content, and, based on said mapping, to select individual ones of said programmatic beans to format said retrieved content for presentation in said associated presentation environments.

2. The method of claim 1, the method further comprising: adding a new entry in said mapping for each new bean which has been configured to format content formatted by a new attribute in said markup language.

3. The method of claim 1, wherein said markup language is the extensible markup language (XML).

4. The method of claim 3, wherein said mapping step comprises:

mapping selected attributes specified in an XML document type definition (DTD) to corresponding ones of said configured beans.

5. The method of claim 4, the method further comprising: adding a new entry in said DTD for each new bean which has been configured to format content formatted by a new XML attribute.

6. The method of claim 1, the method further comprising: configuring a default bean to format content where an associated attribute has not been mapped to any of said plurality of programmatic beans.

7. A variable content rendering system comprising:

a plurality of programmatic beans configured to format content in particular ones of the presentation environments;

a mapping of selected attributes of a markup language to corresponding ones of said configured beans; and, a servlet configured to receive requests for content from individual content browsers in associated presentation environments, to retrieve said requested content, to identify individual markup language attributes in said retrieved content, and, based on said mapping, to select individual ones of said programmatic beans to format said retrieved content for presentation in said associated presentation environments.

8. The variable content rendering system of claim 7 further comprising:

a properties file storing alternative parameters for overriding individual entries in said mapping.

9. The variable content rendering system of claim 7, wherein said configured beans comprise:

a plurality of Java beans, each said Java bean having a configuration for formatting content in a particular one of the presentation environments, said content having a format selected from the group consisting of hypertext markup language (HTML), dynamic HTML (DHTML), JavaScript, VBScript, Java Swing, wireless markup language (WML), and compressed HTML (cHTML).

10. The variable content rendering system of claim 7, wherein each of said configured beans comprises:

synchronization logic for synchronizing said content with a corresponding presentation of said content in presentation elements in said particular ones of the presentation environments.

11. A method for variably rendering content for presentation in differing presentation environments, the method comprising:

resolving a mapping between a tag in XML formatted content and a corresponding Java bean which has been configured to render XML-formatted content in a particular one of the differing presentation environments; and, passing said XML-formatted content to said corresponding Java bean, said Java bean formatting said XML-formatted content for presentation in said particular one of the differing presentation environments.

12. The method of claim 11, the method further comprising:

synchronizing said presentation of said XML-formatted content in said particular one of the differing presentation environment with changes in said XML-formatted content.

13. The method of claim 11, the method further comprising:

passing said XML-formatted content to a default Java bean in those cases where a mapping between a tag in XML formatted content and a corresponding Java bean cannot be resolved, said default Java bean having a configuration to format said XML-formatted content using default formatting parameters.

14. A machine readable storage having stored thereon a computer program for variably rendering content for presentation in differing presentation environments, said computer program comprising a routine set of instructions for causing the machine to perform the steps of:

resolving a mapping between a tag in XML-formatted content and a corresponding Java bean which has been configured to render XML-formatted content in a particular one of the differing presentation environments; and, passing said XML-formatted content to said corresponding Java bean, said Java bean formatting said XML-formatted content for presentation in said particular one of the differing presentation environments.

15. The machine readable storage of claim 14, the method further comprising:

synchronizing said presentation of said XML-formatted content in said particular one of the differing presentation environment with changes in said XML-formatted content.

16. The machine readable storage of claim 14, the method further comprising:

passing said XML-formatted content to a default Java bean in those cases where a mapping between a tag in XML formatted content and a corresponding Java bean cannot be resolved, said default Java bean having a configuration to format said XML-formatted content using default formatting parameters.

* * * * *